(12) United States Patent
Montojo et al.

(10) Patent No.: US 8,315,217 B2
(45) Date of Patent: Nov. 20, 2012

(54) METHOD AND APPARATUS FOR CONTROLLING UE EMISSION IN A WIRELESS COMMUNICATION SYSTEM

(75) Inventors: Juan Montojo, San Diego, CA (US); Wanshi Chen, San Diego, CA (US); Peter Gaal, San Diego, CA (US); Arnaud Meylan, Juziers (FR)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 12/564,553

(22) Filed: Sep. 22, 2009

(65) Prior Publication Data

US 2010/0074209 A1    Mar. 25, 2010

Related U.S. Application Data

(60) Provisional application No. 61/099,471, filed on Sep. 23, 2008.

(51) Int. Cl.
*H04W 72/04* (2009.01)
*H04B 1/7103* (2006.01)
*H04B 7/00* (2006.01)
*H04B 15/00* (2006.01)

(52) U.S. Cl. ........ 370/329; 370/318; 370/252; 455/509; 455/522

(58) Field of Classification Search .................. 370/318, 370/328, 329–330, 38, 342–343, 338; 455/501, 455/509, 522, 450, 452.1
See application file for complete search history.

(56) References Cited

U.S. PATENT DOCUMENTS

| | | | | |
|---|---|---|---|---|
| 6,069,883 A * | 5/2000 | Ejzak et al. | | 370/335 |
| 6,246,881 B1 * | 6/2001 | Parantainen et al. | | 455/450 |
| 6,259,685 B1 * | 7/2001 | Rinne et al. | | 370/330 |
| 6,735,447 B1 * | 5/2004 | Muller | | 455/522 |
| 7,912,475 B2 * | 3/2011 | Klang et al. | | 455/452.2 |
| 7,957,757 B2 * | 6/2011 | Celebi et al. | | 455/522 |
| 8,072,918 B2 * | 12/2011 | Muharemovic et al. | | 370/319 |

(Continued)

FOREIGN PATENT DOCUMENTS

EP    0713300 A1    5/1996

(Continued)

OTHER PUBLICATIONS

"LS on UE emission control", 3GPP TSG RAN WG1 Meeting #54bis, R1-083479, Prague, Czech Rep., Sep. 29-Oct. 3, 2008.

(Continued)

*Primary Examiner* — Kwang B Yao
*Assistant Examiner* — Candal Elpenord
(74) *Attorney, Agent, or Firm* — Liem T. Do

(57) ABSTRACT

Techniques for controlling the operation of user equipments (UEs) to mitigate emissions out of band are described. A base station may identify a UE potentially causing excessive emissions out of band due to transmission of control information and may schedule the UE to reduce the emissions out of band. In one design, the base station may schedule the UE to send control information on a Physical Uplink Shared Channel (PUSCH) instead of a Physical Uplink Control Channel (PUCCH). In another design, the base station may assign the UE with resources for the PUCCH to send control information. The assigned resources may be selected to mitigate the emissions out of band and may be (i) located within a target frequency range, (ii) located away from a frequency band to be mitigated with the emissions out of band, or (iii) obtained with a reuse scheme and have less inter-cell interference from other UEs.

40 Claims, 6 Drawing Sheets

U.S. PATENT DOCUMENTS

| | | | |
|---|---|---|---|
| 2007/0042784 A1* | 2/2007 | Anderson | 455/450 |
| 2007/0263585 A1* | 11/2007 | Duan | 370/342 |
| 2008/0176575 A1* | 7/2008 | Sutton | 455/450 |
| 2009/0257356 A1* | 10/2009 | Frederiksen et al. | 370/252 |
| 2009/0290549 A1* | 11/2009 | Tiirola et al. | 370/329 |
| 2010/0029289 A1* | 2/2010 | Love et al. | 455/450 |

FOREIGN PATENT DOCUMENTS

| | | |
|---|---|---|
| WO | WO9965158 A1 | 12/1999 |
| WO | WO0143296 A2 | 6/2001 |
| WO | WO2008057843 A2 | 5/2008 |

OTHER PUBLICATIONS

International Search Report and Written Opinion—PCT/US2009/058110—ISA/EPO—Dec. 29, 2009.

PanaSonic: "Dedicated L1 resource usage after handover" 3GPP Draft: R2-083694_L1_Resource_After_Handove, 3rd Generation Partnership Project (3GPP), Mobile Competence Centre; 650, Route des Lucioles; F-06921 Sophia-Antipolis Cedex; France, vol. RAN WG2, no, Warsaw, Poland Jul. 4, 2008, XP050141020 [retrieved on Jul. 4, 2008] the whole document.

* cited by examiner

METHOD AND APPARATUS FOR CONTROLLING UE EMISSION IN A WIRELESS COMMUNICATION SYSTEM

The present application claims priority to provisional U.S. Application Ser. No. 61/099,471, entitled "A METHOD AND APPARATUS FOR UE EMISSION CONTROL IN A WIRELESS COMMUNICATION SYSTEM," filed Sep. 23, 2008, assigned to the assignee hereof and incorporated herein by reference.

BACKGROUND

I. Field

The present disclosure relates generally to communication, and more specifically to techniques for controlling operation of user equipments (UEs) in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of UEs. A UE may communicate with a base station via the downlink and uplink. The downlink (or forward link) refers to the communication link from the base station to the UE, and the uplink (or reverse link) refers to the communication link from the UE to the base station. The system may operate on a specific frequency channel, which may be defined by a particular center frequency and a particular system bandwidth. It may be desirable to constrain all transmissions in the system to be within the system bandwidth and to reduce undesired emissions outside of the system bandwidth in order to reduce interference to other systems operating on neighboring frequency bands.

SUMMARY

Techniques for controlling the operation of UEs to mitigate emissions out of band are described herein. In one design, a base station may identify a UE potentially causing excessive emissions out of band due to transmission of control information on the uplink. The base station may identify the UE as potentially causing excessive emissions out of band based on the transmit power level of the UE, the frequency of the uplink transmission from the UE, the bandwidth of the uplink transmission, etc. The base station may schedule the UE to reduce the emissions out of band.

In one design, the base station may schedule the UE to send control information on a Physical Uplink Shared Channel (PUSCH) instead of a Physical Uplink Control Channel (PUCCH). The UE may cause excessive emissions out of band when sending only control information on the PUCCH near an edge of the system bandwidth. The base station may schedule the UE to send control information with data, if any, on the PUSCH instead of the PUCCH. The base station may assign the UE with resources for the PUSCH for sending data with semi-persistent scheduling (SPS). The assigned resources for SPS may be selected to reduce the emissions out of band, e.g., may be located within a target frequency range. The base station may schedule the UE to send control information on the assigned resources for SPS instead of on resources for the PUCCH.

In another design, the base station may assign the UE with resources for the PUCCH to send control information. The assigned resources may be selected to mitigate the emissions out of band. In one design, the assigned resources may be located within the target frequency range to reduce the emissions out of band. In another design, the assigned resources may be located away from a frequency band to be mitigated with the emissions out of band. In yet another design, the assigned resources may be obtained with a reuse scheme and may have less interference from other UEs communicating with other base stations. This design may enable the UE to transmit at lower power and hence reduce the emissions out of band.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
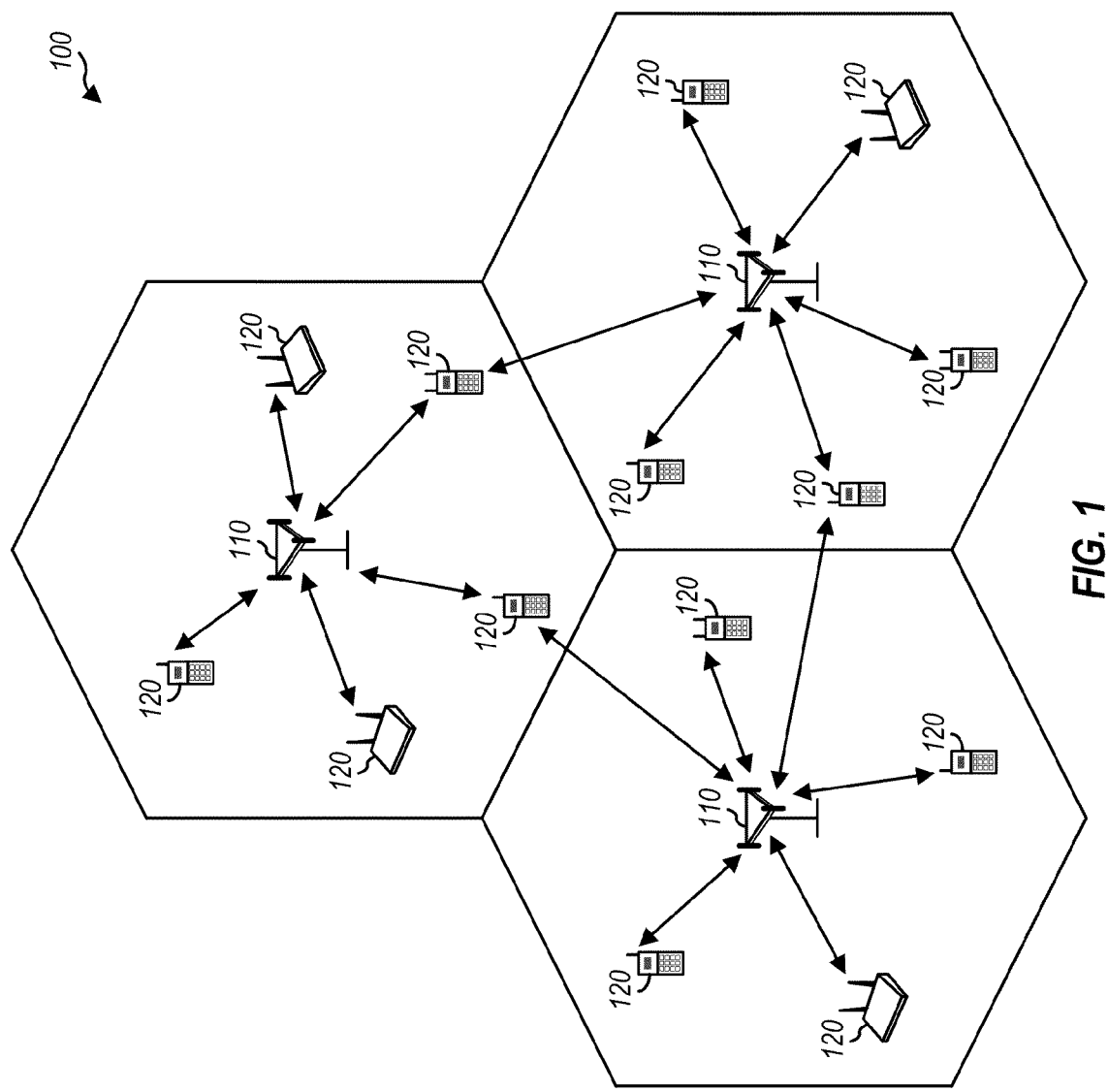
FIG. 1 shows a wireless communication system.

FIG. 1 shows a wireless communication system 100, which may be an LTE system or some other system. System 100 may include a number of evolved Node Bs (eNBs) 110 and other network entities. An eNB may be a station that communicates with the UEs and may also be referred to as a base station, a Node B, an access point, etc. An eNB may provide communication coverage for a particular geographic area. In 3GPP, the term "cell" can refer to a coverage area of an eNB and/or an eNB subsystem serving this coverage area, depending on the context in which the term is used. An eNB may support one or multiple (e.g., three) cells.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc.

The system may support hybrid automatic retransmission (HARQ). For HARQ on the downlink, an eNB may send a transmission of a data packet and may send one or more retransmissions until the data packet is decoded correctly by a UE, or the maximum number of retransmissions has been sent, or some other termination condition is encountered. Each transmission or retransmission of the data packet may be referred to as an HARQ transmission. HARQ may improve reliability of data transmission.

Figure 2:
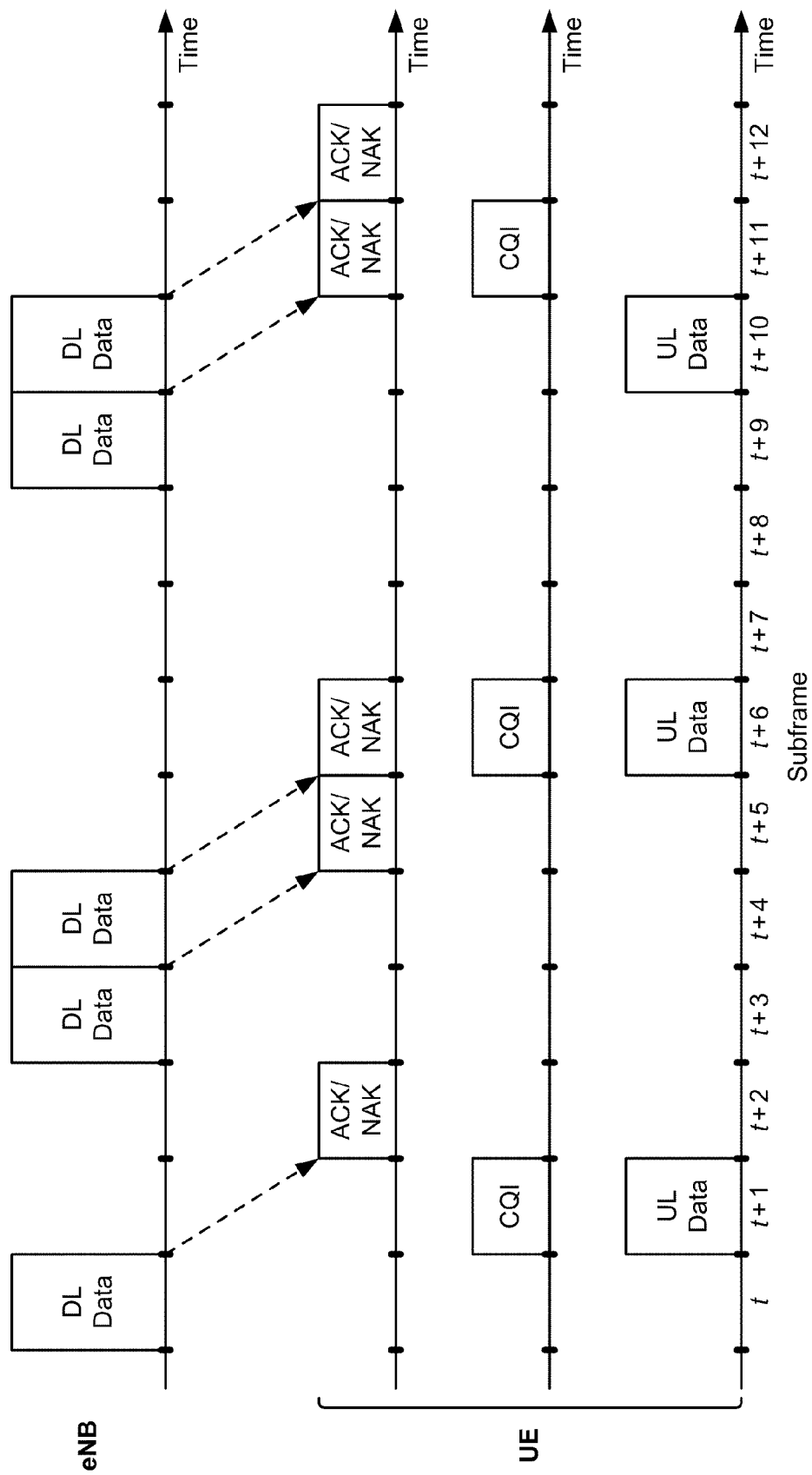
FIG. 2 shows exemplary transmissions on the downlink and uplink.

FIG. 2 shows downlink (DL) transmission by an eNB and uplink (UL) transmission by a UE. The UE may periodically estimate the downlink channel quality for the eNB and may send channel quality indicator (CQI) information to the eNB. The eNB may configure the UE to also send rank indicator (RI) and precoding matrix indicator (PMI) information in order to better support multiple-input multiple-output (MIMO) transmission on the downlink. For simplicity, in the description herein, CQI information can refer to any combination of CQI, PMI, RI, etc. The eNB may use the CQI information and/or other information to select the UE for downlink data transmission and to select a suitable modulation and coding scheme (MCS) and/or a MIMO rank and a precoding matrix for data transmission to the UE. The eNB may process and transmit data to the UE when there is data to send and system resources are available. The UE may process a downlink data transmission from the eNB and may send an acknowledgement (ACK) if the data is decoded correctly or a negative acknowledgement (NAK) if the data is decoded in error. The eNB may retransmit the data if a NAK is received and may transmit new data if an ACK is received. The UE may also transmit data on the uplink to the eNB when there is data to send and the UE is assigned uplink resources.

As shown in FIG. 2, the UE may transmit data and/or control information, or neither, in any given subframe. The control information may comprise CQI information, ACK information, and/or other information. In the description herein, ACK information may comprise ACK or NAK. The UE may be configured by the eNB to send CQI information periodically at regular reporting intervals.

LTE utilizes orthogonal frequency division multiplexing (OFDM) on the downlink and single-carrier frequency division multiplexing (SC-FDM) on the uplink. OFDM and SC-FDM partition a frequency range into multiple (K) orthogonal subcarriers, which are also commonly referred to as tones, bins, etc. The system bandwidth may correspond to a subset of the K total subcarriers, and the remaining subcarriers may be used as guard band. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

Figure 3:
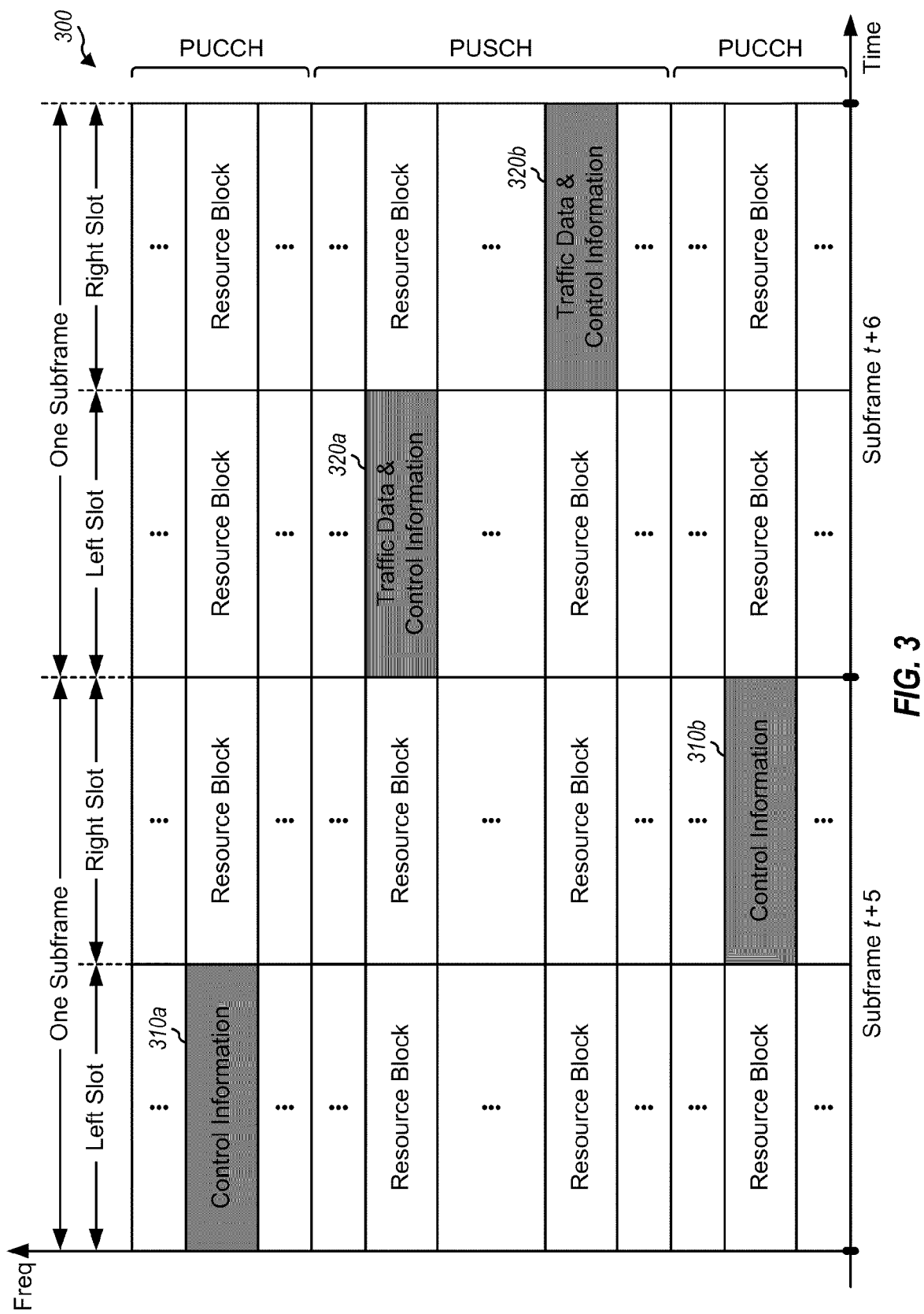
FIG. 3 shows an exemplary transmission structure for the uplink.

FIG. 3 shows a transmission structure 300 that may be used for the uplink. The transmission timeline may be partitioned into units of subframes. Each subframe may have a predetermined duration, e.g., one millisecond (ms), and may be partitioned into two slots. Each slot may include L symbol periods, e.g., L=6 symbol periods for an extended cyclic prefix or L=7 symbol periods for a normal cyclic prefix.

A number of resource blocks may be defined. Each resource block may cover 12 subcarriers in one slot. The available resource blocks may be partitioned into a PUCCH region and a PUSCH region. The PUCCH region may include resource blocks near the two edges of the system bandwidth, as shown in FIG. 3. The PUSCH region may include resource blocks not included in the PUCCH region. A UE may be assigned resource blocks in the PUCCH region to transmit only control information to an eNB. The UE may be assigned resource blocks in the PUSCH region to transmit only data or both data and control information to the eNB. The resource blocks may be paired, and an uplink transmission may span both slots in a subframe. For example, the UE may send a PUCCH transmission with frequency hopping on one resource block near one band edge in the first slot of a subframe and on another resource block near the opposite band edge in the second slot of the subframe, as shown in FIG. 3.

A UE may transmit data and/or control information to an eNB in a given subframe, as shown in FIG. 2. The uplink transmission from the UE should be constrained to be within the system bandwidth in order to avoid causing interference to other systems operating on neighboring bands. However, an uplink transmission from the UE on the PUCCH (i.e., a PUCCH transmission) may cause excessive emissions out of band under certain scenarios.

Figure 4:
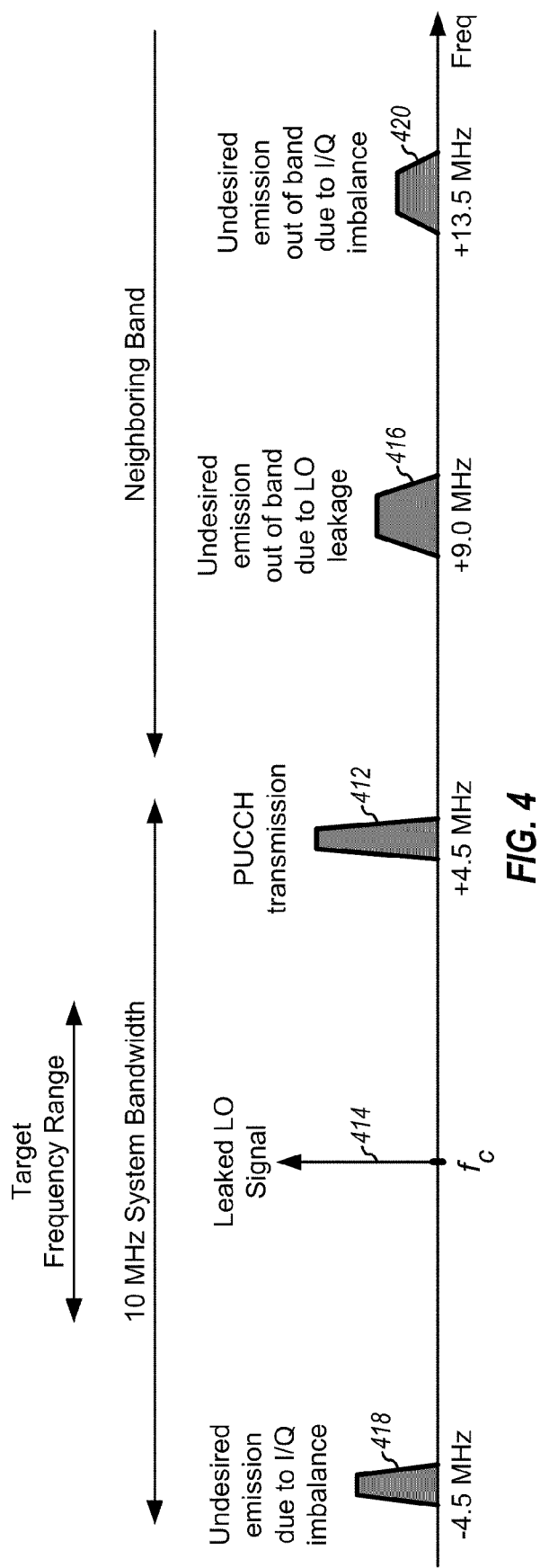
FIG. 4 shows an exemplary spectrum for an uplink transmission from a UE.

FIG. 4 shows an exemplary spectrum for an uplink transmission by a UE. In the example shown in FIG. 4, the system operates on a frequency channel having a system bandwidth of 10 MHz and centered at a frequency of fc. The UE sends a PUCCH transmission at +4.5 MHz from the center frequency, which results in a desired emission 412. The PUCCH transmission may be sent in one resource block, and the desired emission may cover 180 KHz. A transmitter for the UE may have local oscillator (LO) leakage, and a leaked LO signal 414 may be present in the uplink transmission. The leaked LO signal may mix with the PUCCH transmission and generate an undesired emission 416 at +9.0 MHz, which is outside of the system bandwidth. The transmitter may also have inphase/quadrature (I/Q) imbalance due to gain error and/or phase error between the I and Q paths in the transmitter. The I/Q imbalance may generate an undesired emission 418 at −4.5 MHz. The PUCCH transmission may mix with undesired emission 418 and may generate an undesired emission 420 at +13.5 MHz, which is outside of the system bandwidth.

FIG. 4 shows some undesired emissions that may be generated due to LO leakage, I/Q imbalance, and nonlinearity of the transmitter at the UE. Other undesired emissions may also be generated and are not shown in FIG. 4 for simplicity.

As shown in FIG. 4, the UE may generate various undesired emissions that may fall out of band, i.e., outside of the system bandwidth. The magnitude of the undesired emissions may be dependent on the transmit power level of the PUCCH transmission as well as transmitter impairments such as LO leakage, I/Q imbalance, and nonlinearity. The frequency of the undesired emissions may be dependent on the frequency of the PUCCH transmission, as illustrated in FIG. 4. In particular, progressively further out PUCCH transmission may cause undesired emissions progressively further out in frequency.

The undesired emissions may be excessive at high UE transmit power levels (e.g., approaching +23 dBm), which may be the case when the UE is near cell boundary. The undesired emissions that fall out of band may adversely impact the performance of other systems operating on neighboring bands. For example, a neighboring band at the low side of the system bandwidth may be used for public safety systems, which may operate on narrowband frequency channels. A PUCCH transmission at −4.5 MHz from the center frequency (not shown in FIG. 4) may result in undesired emissions at −9.0 MHz and −13.5 MHz, which may cause excessive interference to the narrowband frequency channels that overlap the frequencies of these undesired emissions.

In an aspect, UEs that can potentially cause excessive emissions out of band may be identified and may be referred to as "offending" UEs. An offending UE may or may not actually cause excessive emissions out of band. The operation of the offending UEs may be controlled to reduce the emissions out of band and to mitigate performance degradation to other systems operating on neighboring bands.

An offending UE may be identified based on various factors such as the transmit power level of the uplink transmission sent by the UE, the frequency of the uplink transmission, the bandwidth of the uplink transmission, etc. The offending UE may also be identified based on other factors such as which neighboring bands to mitigate undesired emissions, e.g., bands below and/or above the frequency channel used by the system.

The transmit power level of an uplink transmission may be used to determine whether or not a UE is non-offending. In one design, the UE may be deemed as non-offending if its transmit power level is below a target/threshold power level. This target power level may be determined based on various factors such as specified LO leakage, I/Q imbalance, and nonlinearity of the UE transmitter, specified levels of emissions out of band, etc. Multiple target power levels may also be supported, and one target power level may be selected based on one or more parameters.

The frequency of an uplink transmission may be used to determine whether or not a UE is non-offending. The UE may be deemed as non-offending if its uplink transmission is within a target frequency range. In a first design, the UE may be deemed as non-offending if its uplink transmission is within the center one half of the system bandwidth. This design may ensure that undesired emissions caused by LO leakage would fall within the system bandwidth. In the example shown in FIG. 4, if the PUCCH transmission is at +2.5 MHz, then undesired emission 416 would be at +5.0 MHz instead of +9.0 MHz. In a second design, the UE may be deemed as non-offending if its uplink transmission is within the center one third of the system bandwidth. This design may ensure that undesired emissions caused by I/Q imbalance and LO leakage would fall within the system bandwidth. In the example shown in FIG. 4, if the PUCCH transmission is at +1.6 MHz, then undesired emission 420 would be at +4.8 MHz instead of +13.5 MHz. The second design can address both LO leakage and I/Q imbalance but would place greater restriction on the operating frequencies of the UE. The first design can address LO leakage, which may be more problematic than I/Q imbalance, and would place less restriction on the operating frequencies of the UE. Whether or not the UE is non-offending may also be determined based on some other target frequency range. For example, if undesired emissions falling in neighboring bands lower than the frequency channel of the system are potentially problematic but undesired emissions falling in neighboring bands higher than the frequency channel are acceptable, then the UE may be deemed as non-offending if its uplink transmission is above one half (or one third) of the lower half of the system bandwidth.

The bandwidth of an uplink transmission may also be used to determine whether or not a UE is non-offending. The UE may be able to transmit at lower power for a wider signal bandwidth, which may then reduce emission level. In one design, the UE may be deemed as non-offending if its signal bandwidth is greater than a target bandwidth. This target bandwidth may be determined based on various factors such as specified LO leakage, I/Q imbalance, and nonlinearity of the UE transmitter, specified levels of emissions out of band, etc.

A UE may be deemed as offending or non-offending based on any one or any combination of the factors described above. For example, the UE may be deemed as offending if (i) its transmit power level is above the target power level, (ii) the frequency of its uplink transmission is outside of the target frequency range, and (iii) the bandwidth of its uplink transmission is less than the target bandwidth. The UE may also be deemed as offending based on any one or any combination of conditions (i), (ii) and (iii). Other factors may also be used to determine whether or not the UE is offending.

The operation of an offending UE may be controlled in various manners in order to reduce undesired emissions out of band. In general, the frequency and/or transmit power of an uplink transmission from the UE may be controlled so that the undesired emissions fall inband and/or have low levels.

In a first design for controlling UE operation, coordinated scheduling of data and control information may be used to mitigate emissions out of band from an offending UE. The UE may transmit only control information (e.g., CQI and/or ACK information) on the PUCCH and may transmit both data and control information on the PUSCH, as shown in FIG. 3. The UE may be assigned resource blocks close to the band edges for the PUCCH and may be assigned resource blocks anywhere within the system bandwidth for the PUSCH. The UE may send control information on the PUSCH when it is sent in the same subframe as data. The UE may be scheduled such that it can send control information on the PUSCH instead of the PUCCH.

An eNB may configure the UE for semi-persistent scheduling (SPS) service on the uplink and may assign resources to the UE for uplink transmissions on the PUSCH. The eNB may send an SPS assignment, which may provide periodic transmission opportunities for the UE and may convey specific resource blocks in specific subframes that can be used by the UE for uplink transmission. The periodicity of the SPS transmission opportunities (or SPS periodicity) may be 10, 20, 32, 40, 64, 80, 128, 160, 320 or 640 ms. If the UE is an offending UE, then the eNB may assign resource blocks within the target frequency range for the SPS service. The eNB may configure the UE with the SPS service via Layer 3 signaling and may activate or deactivate the SPS service as necessary.

The eNB may schedule the UE such that data and control information can be sent by the UE on the PUSCH in accordance with the SPS assignment. The eNB may configure the UE to report CQI information at a periodicity of 2, 5, 10, 20, 32, 40, 64, 80, 128 or 160 ms, or some integer multiple of any of these values. If the periodic CQI reporting can be aligned in time with the SPS transmission opportunities, then the UE can send CQI information on the PUSCH instead of the PUCCH. Transmission of CQI information on the PUSCH may be achieved as follows:

Select a CQI periodicity of 10, 20, 32, 40, 64, 80, 128, 160, 320 or 640 ms, or an integer multiple of any of these values, Configure the UE with SPS service and select (i) an SPS periodicity that is the same as the CQI periodicity or (ii) an SPS periodicity such that the CQI periodicity is divisible by the SPS periodicity, Configure SPS transmission opportunities and CQI reporting to coincide in the same subframes, and Assign resource blocks within the target frequency range for SPS to mitigate undesired emissions out of band.

The UE may send ACK information for data transmission received on the downlink from the eNB, as shown in FIG. 2. In one design, the eNB may schedule downlink data transmission to the UE such that the UE can send ACK information on the PUSCH instead of the PUCCH. In particular, the eNB may schedule downlink data transmission such that the corresponding ACK information will coincide with either SPS transmission or data transmission sent by the UE on the uplink. The scheduling may be based on the timing relationship between data transmission on the downlink and corresponding ACK transmission on the uplink. For example, the UE may be configured for SPS transmission in subframes (t mod M), where M is the SPS periodicity in units of subframes and "mod" denotes a modulo operation. If ACK information is sent Q subframes after the corresponding data transmission, then the eNB may send data transmission in subframes ((t−Q) mod M) to ensure ACK transmission by the UE in subframes (t mod M).

The eNB may send data on the downlink such that it can be decoded correctly by the UE with a low number of HARQ transmissions. The eNB may select a modulation and coding scheme such that the data can be decoded correctly with sufficiently high probability after N HARQ transmissions. N may be referred to as a target termination and may be one or greater. The eNB may target downlink data transmission with a low number of HARQ transmissions. In one design, the eNB may send at most two HARQ transmissions for each packet. The eNB may target a low packet error rate (PER) (e.g., 1% PER) after an initial HARQ transmission, so that residual PER after two HARQ transmissions may be negligible. Any residual error may be further corrected, if necessary, via Radio Resources Control (RRC) or quick Medium Access Control (MAC) retransmission.

The UE may be constrained to send ACK information for downlink data transmission in either SPS transmission or uplink data transmission sent on the PUSCH by the UE. The UE may be informed of this constraint via Layer 3 signaling or some other mechanism. The eNB may send a first HARQ transmission for a packet prior to an SPS transmission opportunity for the UE and may receive the corresponding ACK information in an SPS transmission. If a NAK is received for the packet, then the eNB may send a second HARQ transmission for the packet and may expect no ACK information for this HARQ transmission from the UE. The UE may send ACK information for the second HARQ transmission only if it is scheduled to send data on the uplink in the subframe in which the ACK information is to be sent.

The eNB may thus schedule downlink data transmission to occur prior to SPS transmission opportunities for the UE and may further target few (e.g., two) HARQ transmissions. This may ensure that the UE can send ACK information in SPS transmissions on the PUSCH. The eNB may send data on the downlink at the SPS periodicity, which may be as low 10 ms.

The eNB may also send downlink data transmission to coincide (e.g., with a suitable subframe offset) with uplink data transmission from the UE, so that the ACK information can be sent with the uplink data transmission. The eNB may schedule the UE for uplink data transmission with a dynamic uplink assignment for the PUSCH.

In another design, the UE may bundle ACK information for downlink data transmission and may send the bundled ACK information in the next SPS transmission opportunity. The UE may receive an HARQ transmission in subframe t and may not have an SPS transmission opportunity in subframe t+Q to send the ACK information. The UE may then send the ACK information in the next SPS transmission opportunity.

In a second design for controlling UE operation, an offending UE may be assigned resources within the target frequency range for sending control information in order to mitigate emissions out of band. Resources for periodically sending CQI information (or CQI resources) may be identified by indices that may start at the band edge and move inward. Similarly, semi-persistent resources for sending ACK information (or semi-persistent ACK resources) for data sent on the downlink with SPS may be identified by indices that may start at the band edge and move inward. The UE may be assigned CQI resources and/or semi-persistent ACK resources. The assigned CQI resources and/or semi-persistent ACK resources may be conveyed by parameters in Layer 3 signaling. The UE can send control information on the assigned resources for the PUCCH. However, the UEs may be assigned resource indices large enough such that uplink transmission of control information from the UE is not necessarily limited to the PUCCH region but can be somewhere in the PUSCH region.

For periodic CQI reporting, the index of the assigned CQI resources may be selected such that CQI transmissions from the UE are not limited to a CQI region. The PUCCH region may include a CQI region, an SPS ACK region, and a dynamic ACK region, which may be defined in that order starting from the outer edge of the system bandwidth and moving toward the center. An eNB may signal a parameter $N_{RB}^{(2)}$ to inform the UE where the ACK regions start, so that the UE can calculate the proper ACK resource index. CQI resources assigned to individual UEs may be constrained to be outside of the boundary indicated by $N_{RB}^{(2)}$. However, this constraint is not an explicit requirement (i.e., not mandatory) in the LTE specifications. This fact may be exploited to enable assignment of CQI resources further away from the band edge and outside of the CQI region to the offending UE. The UE may assume or may be notified that the CQI resource index is a valid configuration and may send CQI information using the indicated index.

The UE may be configured for downlink SPS service and may be assigned semi-persistent ACK resources. The index of the assigned semi-persistent ACK resources may be large enough to mitigate emissions out of band. It may be desirable to reduce SPS transmission overhead. In this case, the SPS periodicity may be configured as large as possible, e.g., 640 ms.

The UE may be scheduled for downlink data transmission in a given subframe with a dynamic downlink assignment. The UE may send ACK information for the downlink data transmission on ACK resources that may be linked to control channel elements (CCEs) used to send the downlink assignment. The ACK resources may be linked to the CCEs by a resource block offset. The resource block offset may be selected such that the ACK resources are moved within the target frequency range. In general, the resource block offset may be selected such that the assigned resources for the PUCCH (e.g., for sending CQI and/or ACK information) are moved within the target frequency range so that emissions out of band from the UE can be mitigated. The resource block offset may be conveyed via Layer 3 signaling or some other mechanism.

In a third design for controlling UE operation, an offending UE may be assigned resources at a band edge that is opposite of a neighboring band in which mitigation of undesired emissions is desired. Excessive emissions may be acceptable for one side of the frequency channel (which may be referred to as an unprotected side) but may be unacceptable for an opposite side of the frequency channel (which may be referred to as a protected side). The UE may be scheduled on the unprotected side opposite of the protected side. The third design may allow the UE to send control information on the PUCCH and may create no new restrictions for the PUSCH.

The UE may send a PUCCH transmission with frequency hopping and may then send uplink transmissions near both edges of the system bandwidth, e.g., as shown in FIG. 3. In one design, a PUCCH assignment may include a hop bit that may indicate whether or not to hop. The UE may be assigned PUCCH resources without hopping by setting the hop bit to an appropriate value. The UE may then send uplink transmissions on the PUCCH at the band edge near the unprotected side.

PUCCH resources at the two edges of the system bandwidth may be paired to facilitate frequency hopping. The offending UE may be paired with a non-offending UE. The offending UE may be assigned PUCCH resources near the unprotected side, and the non-offending UE may be assigned the paired PUCCH resources near the protected side. The offending and non-offending UEs may stay in their respective ends without frequency hopping.

The eNB may schedule UEs to avoid collisions between hopping PUCCH and non-hopping PUCCH. If another UE is assigned a hopping PUCCH that collides with a non-hopping PUCCH of the offending UE, then the other UE may send discontinuous transmission (DTX) in the slot in which the hopping PUCCH collides with the non-hopping PUCCH. The other UE may detect for collision based on unicast or broadcast signaling sent by the eNB.

In a fourth design for controlling UE operation, an offending UE may have its transmit power limited in order to mitigate emissions out of band. To obtain acceptable performance for the UE at the limited transmit power level, an eNB may assign the UE with resources having less interference from other UEs in other cells. This may enable the eNB to obtain good received signal quality for the UE even at the limited transmit power level. Resources with less inter-cell interference may be obtained in various manners.

In one design, fractional frequency reuse (FFR) may be employed to obtain resources with less inter-cell interference. Neighboring eNBs may be allocated different portions of PUCCH resources not allocated to nearby eNBs. Each eNB may assign its allocated PUCCH resources to its offending UEs, which may then observe less interference from other UEs communicating with other eNBs. The offending UEs can transmit at lower power and still achieve the desired received signal quality at the eNB. FFR may be implemented by (i) configuring a number of resource blocks for CQI, mixed CQI and ACK, persistent ACK, and dynamic ACK and (ii) configuring the resource indices for the offending and non-offending UEs such that the offending UEs observe less inter-cell interference on the uplink.

In another design, time division multiplexing (TDM) may be employed to obtain resources with less inter-cell interference. Neighboring eNBs may be allocated certain resource blocks in certain subframes not allocated to nearby eNBs. Each eNB may assign its allocated resource blocks to its offending UEs, which may then observe less interference from other UEs communicating with other eNBs.

In yet another design, dynamic resource allocation may be performed to obtain resources with less inter-cell interference. Whenever an offending UE desires to send control information on the uplink, a resource request may be sent to ask neighboring eNBs to clear certain resources to be used by the offending UE. The offending UE may then send its control information on the cleared resources and may observe less inter-cell interference. Resources with less inter-cell interference may also be obtained in other manners. By assigning these resources to the offending UEs, the probability of these UEs transmitting at high power may be reduced, which may then mitigate emissions out of band.

Figure 5:
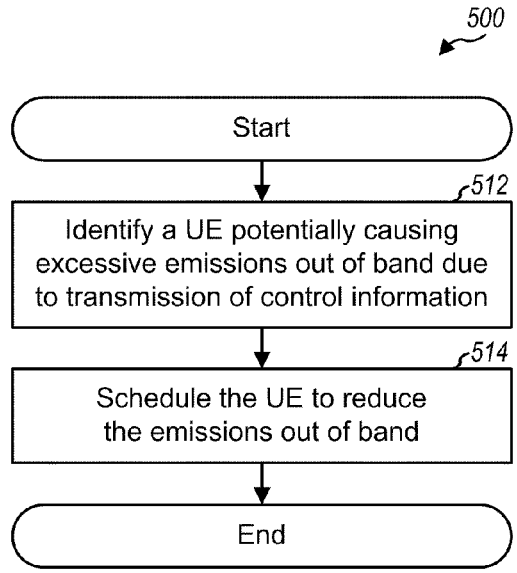
FIGS. 5 and 6 show a process and an apparatus, respectively, for scheduling a UE to mitigate emissions out of band.

FIG. 5 shows a design of a process 500 for scheduling a UE to mitigate emissions out of band. Process 500 may be performed by a base station/eNB (as described below) or by some other entity. The base station may identify a UE potentially causing excessive emissions out of band due to transmission of control information (block 512). The base station may identify the UE as potentially causing excessive emissions out of band based on the transmit power level of the UE, the frequency of the uplink transmission from the UE, the bandwidth of the uplink transmission, some other factor, or a combination thereof. For example, the UE may be deemed as potentially causing excessive emissions out of band if (i) the transmit power level of the UE exceeds a target power level and/or (ii) the frequency of the uplink transmission from the UE is outside a target frequency range, which may be a fraction of the system bandwidth. The UE may or may not actually cause excessive emissions out of band. The base station may schedule the UE to reduce the emissions out of band (block 514). The scheduling may be performed in various manners.

In a first design, the base station may schedule the UE to send control information on the PUSCH instead of the PUCCH. The UE may cause excessive emissions out of band when sending only control information on the PUCCH near an edge of the system bandwidth. The base station may schedule the UE to send control information with data, if any, on the PUSCH instead of the PUCCH.

The base station may assign the UE with resources for the PUSCH for sending data with SPS. The assigned resources for SPS may be selected to reduce the emissions out of band, e.g., may be located within the target frequency range. The base station may then schedule the UE to send control information on the assigned resources for SPS instead of on resources available for sending the control information on the PUCCH. For example, the base station may configure the UE to periodically send CQI information on the assigned resources for SPS. As another example, the base station may schedule the UE for data transmission on the downlink to enable the UE to send ACK information for the data transmission on the assigned resources for SPS instead of on ACK resources associated with the data transmission. The base station may target the data transmission to terminate after two transmissions of a data packet comprising first and second transmissions. The UE may send ACK information for the first transmission on the assigned resources for SPS. The UE may send ACK information for the second transmission only if the UE is scheduled for data transmission on the uplink in a subframe in which the ACK information for the second transmission is to be sent. Alternatively, the UE may bundle ACK information for the data transmission on the downlink and may send the bundled ACK information in a next transmission opportunity on the assigned resources for SPS.

In a second design, the base station may assign the UE with resources located within the target frequency range to reduce the emissions out of band. A PUCCH region may include resources at two edges of the system bandwidth, and a PUSCH region may include resources in the middle of the system bandwidth, e.g., as shown in FIG. 3. The assigned resources may be within the PUSCH region instead of the PUCCH region. The assigned resources may be used by the UE for periodically sending CQI information, for sending ACK information for data transmission sent periodically on the downlink with SPS, for sending ACK information for data transmission sent on the downlink with dynamic scheduling, etc.

In a third design, the base station may assign the UE with resources located away from a frequency band to be mitigated with the emissions from the UE. The frequency band may be located next to a first side of the system bandwidth. The base station may schedule the UE for transmission on a second side of the system bandwidth opposite of the first side. The base station may disable frequency hopping for the UE.

In a fourth design, the base station may assign the UE with resources having less interference from other UEs communicating with other base stations. The base station may determine a set of resources allocated to it. The set of resources may be obtained with a reuse scheme (e.g., FFR or TDM) and may have less interference from the other UEs communicating with the other base stations. The base station may assign the UE with resources selected from the set of resources. The base station may also schedule the UE to reduce the emissions out of band in other manners.

Figure 6:
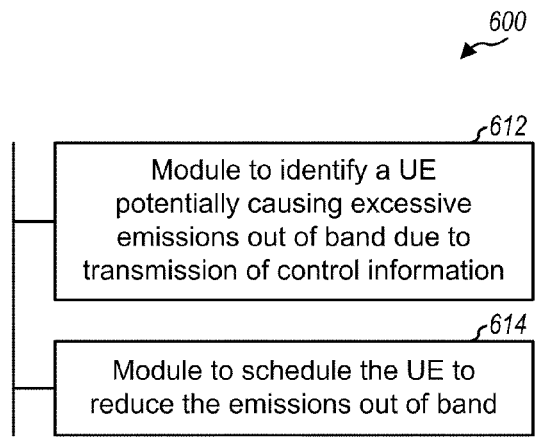

FIG. 6 shows a design of an apparatus 600 for scheduling a UE to mitigate emissions out of band. Apparatus 600 includes a module 612 to identify a UE potentially causing excessive emissions out of band due to transmission of control information, and a module 614 to schedule the UE to reduce the emissions out of band.

Figure 7:
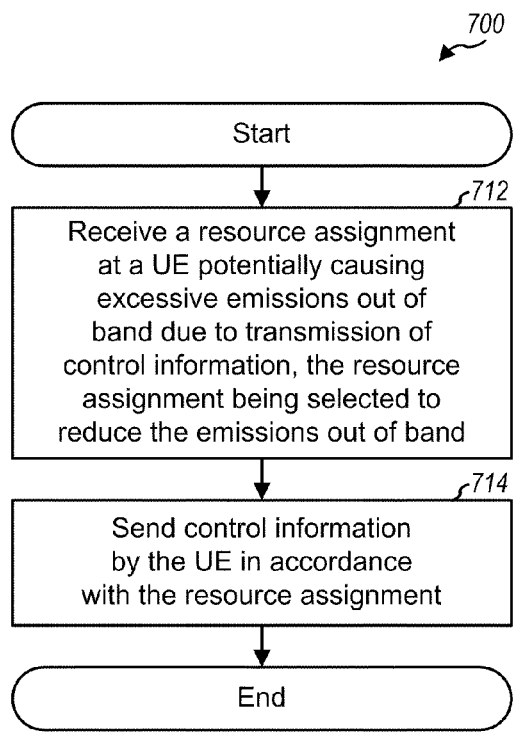
FIGS. 7 and 8 show a process and an apparatus, respectively, for mitigating emissions out of band by a UE.

FIG. 7 shows a design of a process 700 for mitigating emissions out of band. Process 700 may be performed by a UE (as described below) or by some other entity. The UE may potentially cause excessive emissions out of band due to transmission of control information. The UE may receive a resource assignment selected to reduce the emissions out of band (block 712). The UE may send control information in accordance with the resource assignment (block 714).

In a first design, the UE may send control information on the PUSCH instead of the PUCCH. The UE may cause excessive emissions out of band when sending only control information on the PUCCH near an edge of the system bandwidth. The resource assignment may comprise resources for the PUSCH. The UE may send control information with data, if any, on the resources for the PUSCH.

The resource assignment may comprise resources for sending data with SPS, with the assigned resources being selected to reduce the emissions out of band. The UE may send control information on the assigned resources for SPS instead of on resources available for sending the control information. For example, the UE may receive an indication/configuration to periodically send CQI information and may periodically send the CQI information on the assigned resources for SPS. As another example, the UE may receive data transmission on the downlink and may send ACK information for the data transmission on the assigned resources for SPS instead of on ACK resources associated with the data transmission. The UE may receive up to two transmissions of a data packet comprising first and second transmissions. The UE may send ACK information for the first transmission on the assigned resources for SPS. The UE may send ACK information for the second transmission only if the UE is scheduled for data transmission on the uplink in a subframe in which the ACK information for the second transmission is to be sent. Alternatively, the UE may bundle ACK information for the data transmission on the downlink and may send the bundled ACK information in a next transmission opportunity on the assigned resources for SPS.

In a second design, the resource assignment may comprise resources located within a target frequency range to reduce the emissions out of band. The UE may send CQI information periodically, or ACK information for data transmission sent periodically on the downlink with SPS, or ACK information for data transmission sent on the downlink with dynamic scheduling, and/or other control information on the assigned resources.

In a third design, the resource assignment may comprise resources located away from a frequency band to be mitigated with the emissions out of band. The UE may send control information on the assigned resources without frequency hopping.

In a fourth design, the resource assignment may comprise resources having less interference from other UEs communicating with other base stations. The UE may send control information on the assigned resources. The UE may also send control information in other manners to mitigate the emissions out of band.

Figure 8:
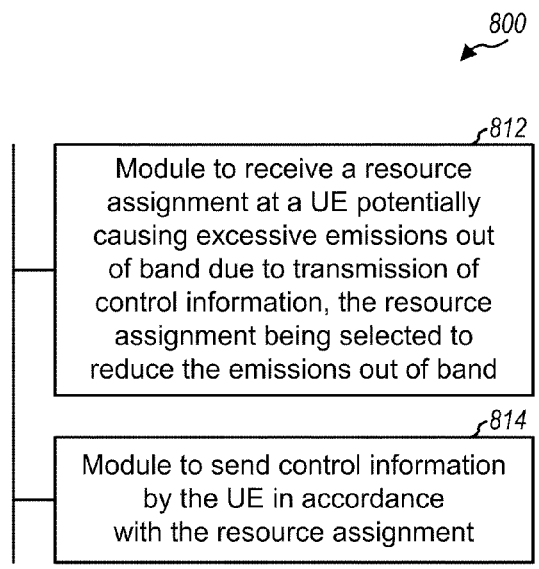

FIG. 8 shows a design of an apparatus 800 for mitigating emissions out of band. Apparatus 800 includes a module 812 to receive a resource assignment at a UE potentially causing excessive emissions out of band due to transmission of control information, the resource assignment being selected to reduce the emissions out of band, and a module 814 to send control information by the UE in accordance with the resource assignment.

The modules in FIGS. 6 and 8 may comprise processors, electronics devices, hardware devices, electronics components, logical circuits, memories, software codes, firmware codes, etc., or any combination thereof.

Figure 9:
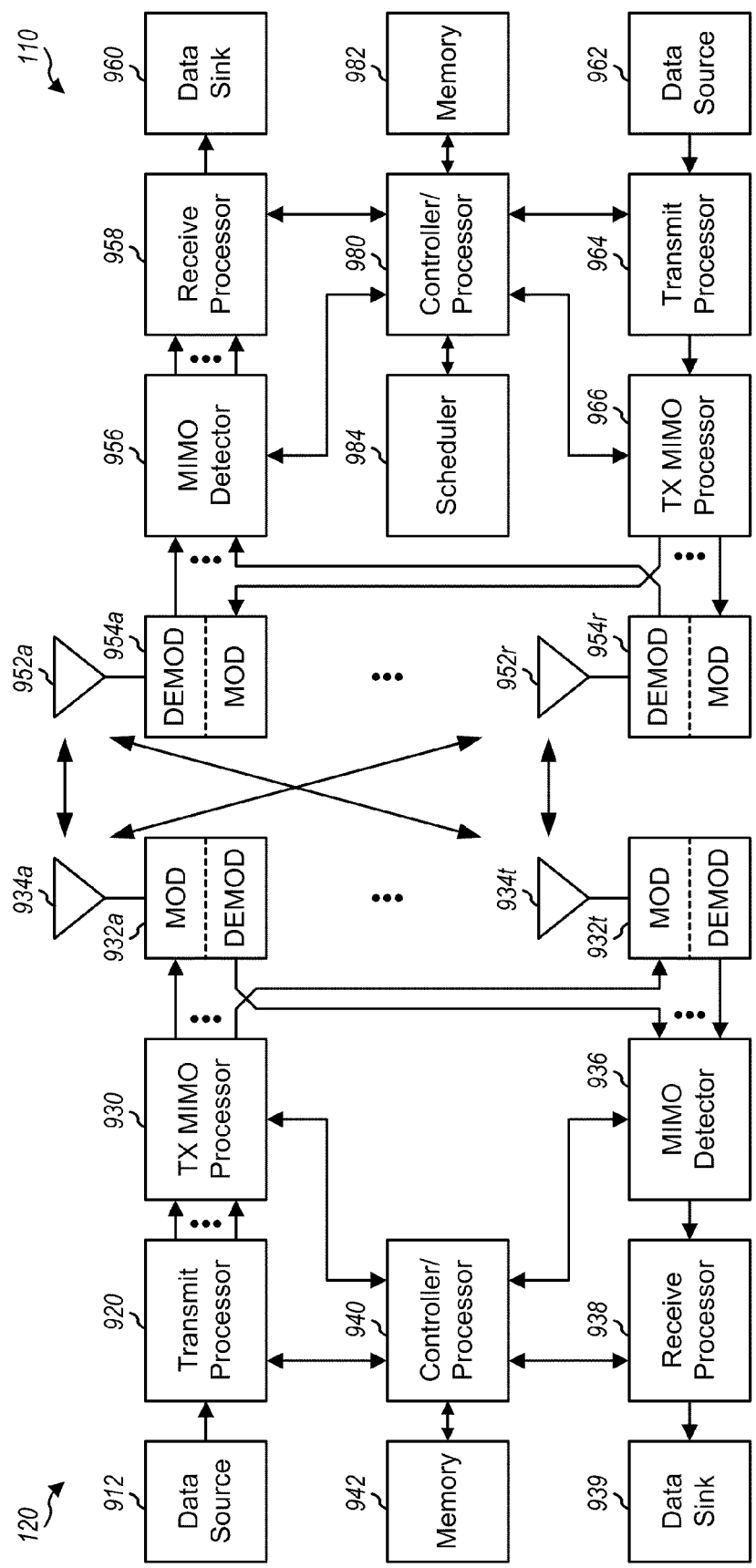
FIG. 9 shows a block diagram of a base station and a UE.

FIG. 9 shows a block diagram of a design of a base station/eNB 110 and a UE 120, which may be one of the eNBs and one of the UEs in FIG. 1. UE 120 may be equipped with T antennas 934a through 934t, and eNB 110 may be equipped with R antennas 952a through 952r, where in general $T \geq 1$ and $R \geq 1$.

At UE 120, a transmit processor 920 may receive data from a data source 912, process (e.g., encode, interleave, and modulate) the data based on one or more modulation and coding schemes, and provide data symbols. Transmit processor 920 may also process control information (e.g., CQI and/or ACK information) from a controller/processor 940 and provide control symbols. Transmit processor 920 may also generate reference symbols for a reference signal or pilot. A transmit (TX) MIMO processor 930 may perform spatial processing (e.g., precoding) on the data symbols, the control symbols, and/or the reference symbols from transmit processor 920, if applicable, and may provide T output symbol streams to T modulators (MODs) 932a through 932t. Each modulator 932 may process a respective output symbol stream (e.g., for SC-FDMA) to obtain an output sample stream. Each modulator 932 may further process (e.g., convert to analog, amplify, filter, and upconvert) the output sample stream to obtain an uplink signal. T uplink signals from modulators 932a through 932t may be transmitted via T antennas 934a through 934t, respectively.

At eNB 110, antennas 952a through 952r may receive the uplink signals from UE 120 and provide received signals to demodulators (DEMODs) 954a through 954r, respectively. Each demodulator 954 may condition (e.g., filter, amplify, downconvert, and digitize) a respective received signal to obtain received samples. Each demodulator 954 may further process the received samples (e.g., for SC-FDMA) to obtain received symbols. A MIMO detector 956 may obtain received symbols from all R demodulators 954a through 954r, perform MIMO detection on the received symbols if applicable, and provide detected symbols. A receive processor 958 may process (e.g., demodulate, deinterleave, and decode) the detected symbols, provide decoded data to a data sink 960, and provide decoded control information to a controller/processor 980.

On the downlink, at eNB 110, data from a data source 962 and control information (e.g., resource assignments) from controller/processor 980 may be processed by a transmit processor 964, precoded by a TX MIMO processor 966 if applicable, conditioned by modulators 954a through 954r, and transmitted to UE 120. At UE 120, the downlink signals from eNB 110 may be received by antennas 934, conditioned by demodulators 932, processed by a MIMO detector 936 if applicable, and further processed by a receive processor 938 to obtain the data and control information sent to UE 120.

Controllers/processors 940 and 980 may direct the operation at UE 120 and eNB 110, respectively. Processor 940 and/or other processors and modules at UE 120 may perform or direct process 700 in FIG. 7 and/or other processes for the techniques described herein. Processor 980 and/or other processors and modules at eNB 110 may perform or direct process 500 in FIG. 5 and/or other processes for the techniques described herein. Memories 942 and 982 may store data and program codes for UE 120 and eNB 110, respectively. A scheduler 984 may schedule UEs for downlink and/or uplink transmission and may provide resource assignments for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is
1. A method for wireless communication, comprising:
  identifying a user equipment (UE) potentially causing excessive emissions out of band due to transmission of control information; and
  scheduling the UE to reduce the emissions out of band, wherein the scheduling includes:
  assigning the UE with resources for sending data with semi-persistent scheduling (SPS), the assigned resources for SPS being selected to reduce the emissions out of band; and
  scheduling the UE to send the control information on the assigned resources for SPS instead of on resources available for sending the control information.

2. The method of claim 1, wherein the identifying the UE potentially causing excessive emissions out of band includes identifying the UE as potentially causing excessive emissions out of band based on transmit power level of the UE, or frequency of uplink transmission of control information from the UE, or bandwidth of the uplink transmission, or a combination thereof.

3. The method of claim 1, wherein the UE is deemed as potentially causing excessive emissions out of band if transmit power level of the UE exceeds a target power level, or if frequency of uplink transmission of control information from the UE is outside a target frequency range, or both.

4. The method of claim 1, wherein the UE potentially causes excessive emissions out of band when sending only control information on a Physical Uplink Control Channel (PUCCH) near an edge of system bandwidth, and wherein the scheduling the UE to reduce the emissions out of band includes scheduling the UE to send the control information with data, if any, on a Physical Uplink Shared Channel (PUSCH).

5. The method of claim 1, wherein the scheduling the UE to send the control information on the assigned resources for SPS includes configuring the UE to periodically send channel quality indicator (CQI) information on the assigned resources for SPS.

6. The method of claim 1, wherein the scheduling the UE to send the control information on the assigned resources for SPS includes scheduling the UE for data transmission on downlink to enable the UE to send acknowledgement (ACK) information for the data transmission on the assigned resources for SPS instead of on ACK resources associated with the data transmission.

7. The method of claim 6, wherein the scheduling the UE for data transmission on the downlink includes targeting the data transmission to terminate after two transmissions of a data packet including first and second transmissions, and wherein the UE sends ACK information for the first transmission on the assigned resources for SPS and sends ACK information for the second transmission only if the UE is scheduled for data transmission on uplink in a subframe in which the ACK information for the second transmission is to be sent.

8. The method of claim 6, wherein the UE bundles ACK information for the data transmission on the downlink and sends the bundled ACK information in a next transmission opportunity on the assigned resources for SPS.

9. The method of claim 1, wherein the scheduling the UE to reduce the emissions out of band includes assigning the UE with resources for sending the control information, the assigned resources having less interference from other UEs communicating with other base stations.

10. The method of claim 9, wherein the assigning the UE with resources for sending the control information includes determining a set of resources allocated to a base station, the set of resources being obtained with a reuse scheme and having less interference from the other UEs communicating with the other base stations, and
  assigning the UE with resources selected from the set of resources.

11. A method for wireless communication, comprising:
  identifying a user equipment (UE) potentially causing excessive emissions out of band due to transmission of control information; and
  scheduling the UE to reduce the emissions out of band, wherein the scheduling includes assigning the UE with resources for sending the control information, the assigned resources being:
  located within a target frequency range to reduce the emissions out of band; and
  for data transmission with semi-persistent scheduling (SPS).

12. The method of claim 11, wherein a Physical Uplink Control Channel (PUCCH) region includes resources at two edges of system bandwidth and a Physical Uplink Shared Channel (PUSCH) region includes resources in middle of the system bandwidth, and wherein the assigned resources are within the PUSCH region.

13. The method of claim 11, wherein the assigned resources are for periodically sending channel quality indicator (CQI) information or for sending acknowledgement (ACK) information for data transmission.

14. A method for wireless communication, comprising:
  identifying a user equipment (UE) potentially causing excessive emissions out of band due to transmission of control information; and
  scheduling the UE to reduce the emissions out of band, wherein the scheduling includes:
  identifying a frequency band to be mitigated with the emissions out of band, the frequency band being located next to a first side of system bandwidth,
  scheduling the UE for transmission on a second side of the system bandwidth opposite of the first side, and
  disabling frequency hopping for the UE.

15. An apparatus for wireless communication, comprising:
  means for identifying a user equipment (UE) potentially causing excessive emissions out of band due to transmission of control information; and
  means for scheduling the UE to reduce the emissions out of band, the means for scheduling includes:
  means for assigning the UE with resources for sending data with semi-persistent scheduling (SPS), the assigned resources for SPS being selected to reduce the emissions out of band, and
  means for scheduling the UE to send the control information on the assigned resources for SPS instead of on resources available for sending the control information.

16. The apparatus of claim 15, wherein the means for identifying the UE potentially causing excessive emissions out of band includes means for identifying the UE as potentially causing excessive emissions out of band based on transmit power level of the UE, or frequency of uplink transmission of the control information from the UE, or bandwidth of the uplink transmission, or a combination thereof.

17. The apparatus of claim 15, wherein the UE potentially causes excessive emissions out of band when sending only control information on a Physical Uplink Control Channel (PUCCH) near an edge of system bandwidth, and wherein the means for scheduling the UE to reduce the emissions out of band includes means for scheduling the UE to send control information with data, if any, on a Physical Uplink Shared Channel (PUSCH).

18. The apparatus of claim 15, wherein the means for scheduling the UE to reduce the emissions out of band includes means for assigning the UE with resources for sending the control information, the assigned resources being located within a target frequency range, or being located away from a frequency band to be mitigated with the emissions out of band, or having less interference from other UEs communicating with other base stations.

19. An apparatus for wireless communication, comprising: at least one processor; and a memory having instructions executable by the at least one processor, wherein the at least one processor is configured to identify a user equipment (UE) potentially causing excessive emissions out of band due to transmission of control information, and to schedule the UE to reduce the emissions out of band, wherein the at least one processor is further configured to: assign the UE with resources for sending data with semi-persistent scheduling (SPS), the assigned resources for SPS being selected to reduce the emissions out of band; and schedule the UE to send the control information on the assigned resources for SPS instead of on resources available for sending the control information.

20. The apparatus of claim 19, wherein the at least one processor is configured to identify the UE as potentially causing excessive emissions out of band based on transmit power level of the UE, or frequency of uplink transmission of the control information from the UE, or bandwidth of the uplink transmission, or a combination thereof.

21. The apparatus of claim 19, wherein the UE potentially causes excessive emissions out of band when sending only control information on a Physical Uplink Control Channel (PUCCH) near an edge of system bandwidth, and wherein the at least one processor is configured to schedule the UE to send the control information with data, if any, on a Physical Uplink Shared Channel (PUSCH).

22. The apparatus of claim 19, wherein the at least one processor is configured to assign the UE with resources for sending the control information, the assigned resources being located within a target frequency range, or being located away from a frequency band to be mitigated with the emissions out of band, or having less interference from other UEs communicating with other base stations.

23. A computer program product, comprising:
a non-transitory computer-readable medium comprising:
code for causing at least one computer to identify a user equipment (UE) potentially causing excessive emissions out of band due to transmission of control information, and
code for causing the at least one computer to schedule the UE to reduce the emissions out of band, the scheduling including:
assigning the UE with resources for sending data with semi-persistent scheduling (SPS), the assigned resources for SPS being selected to reduce the emissions out of band, and
scheduling the UE to send the control information on the assigned resources for SPS instead of on resources available for sending the control information.

24. A method for wireless communication, comprising:
receiving a resource assignment at a user equipment (UE) potentially causing excessive emissions out of band due to transmission of control information, the resource assignment being selected to reduce the emissions out of band; and
sending control information by the UE in accordance with the resource assignment;
wherein the resource assignment includes resources for sending data with semi-persistent scheduling (SPS); and
wherein the sending the control information by the UE includes sending the control information on the assigned resources for SPS instead of on resources available for sending the control information.

25. The method of claim 24, wherein the UE potentially causes excessive emissions out of band when sending only control information on a Physical Uplink Control Channel (PUCCH) near an edge of system bandwidth, wherein the resource assignment includes resources for a Physical Uplink Shared Channel (PUSCH), and wherein the sending the control information by the UE includes sending the control information with data, if any, on the resources for the PUSCH.

26. The method of claim 24, further including:
receiving an indication to periodically send channel quality indicator (CQI) information by the UE, and wherein the sending the control information includes periodically sending the CQI information on the assigned resources for SPS.

27. The method of claim 24, further including:
receiving data transmission on downlink at the UE, and wherein the sending the control information includes sending acknowledgement (ACK) information for the data transmission on the assigned resources for SPS instead of on ACK resources associated with the data transmission.

28. The method of claim 27, wherein the receiving the data transmission includes receiving up to two transmissions of a data packet including first and second transmissions, and wherein the sending ACK information includes
sending ACK information for the first transmission on the assigned resources for SPS, and
sending ACK information for the second transmission only if the UE is scheduled for data transmission on uplink in a subframe in which the ACK information for the second transmission is to be sent.

29. The method of claim 27, wherein the sending ACK information includes
bundling ACK information for the data transmission on the downlink, and
sending the bundled ACK information in a next transmission opportunity on the assigned resources for SPS.

30. The method of claim 24,
wherein the resource assignment includes resources having less interference from other UEs communicating with other base stations, and wherein the sending the control information includes sending control information on the assigned resources.

31. A method for wireless communication, comprising:
receiving a resource assignment at a user equipment (UE) potentially causing excessive emissions out of band due to transmission of control information, the resource assignment being selected to reduce the emissions out of band; and
sending control information by the UE in accordance with the resource assignment;
wherein the resource assignment includes resources for sending the control information, the assigned resources being located within a target frequency range to reduce the emissions out of band; and for data transmission with semi-persistent scheduling (SPS).

32. The method of claim 31, wherein the assigned resources are for periodically sending channel quality indicator (CQI) information or for sending acknowledgement (ACK) information for data transmission.

33. A method for wireless communication, comprising:
receiving a resource assignment at a user equipment (UE) potentially causing excessive emissions out of band due to transmission of control information, the resource assignment being selected to reduce the emissions out of band; and
sending control information by the UE in accordance with the resource assignment;
wherein a frequency band to be mitigated with the emissions out of band is located next to a first side of system bandwidth, wherein the resource assignment includes resources on a second side of the system bandwidth opposite of the first side, and wherein the sending the control information includes sending the control information on the assigned resources without frequency hopping.

34. An apparatus for wireless communication, comprising:
means for receiving a resource assignment at a user equipment (UE) potentially causing excessive emissions out of band due to transmission of control information, the resource assignment being selected to reduce the emissions out of band; and
means for sending the control information by the UE in accordance with the resource assignment;
wherein the resource assignment includes resources for sending data with semi-persistent scheduling (SPS); and
wherein the means for sending the control information by the UE includes means for sending control information on the assigned resources for SPS instead of on resources available for sending the control information.

35. The apparatus of claim 34, wherein the UE potentially causes excessive emissions out of band when sending only control information on a Physical Uplink Control Channel (PUCCH) near an edge of system bandwidth, wherein the resource assignment includes resources for a Physical Uplink Shared Channel (PUSCH), and wherein the means for sending the control information by the UE includes means for sending the control information with data, if any, on the resources for the PUSCH.

36. The apparatus of claim 34, wherein the resource assignment includes resources for sending control information, the assigned resources being located within a target frequency range, or being located away from a frequency band to be mitigated with the emissions out of band, or having less interference from other UEs communicating with other base stations, and wherein the means for sending control information includes means for sending control information on the assigned resources.

37. An apparatus for wireless communication, comprising:
at least one processor; and
a memory having instructions executable by the at least one processor, wherein the at least one processor is configured to:
receive a resource assignment at a user equipment (UE) potentially causing excessive emissions out of band due to transmission of control information, the resource assignment being selected to reduce the emissions out of band; and
send control information by the UE in accordance with the resource assignment;
wherein the resource assignment includes resources for sending data with semi-persistent scheduling (SPS); and
wherein the at least one processor is further configured to send the control information on the assigned resources for SPS instead of on resources available for sending the control information.

38. The apparatus of claim 37, wherein the UE potentially causes excessive emissions out of band when sending only control information on a Physical Uplink Control Channel (PUCCH) near an edge of system bandwidth, wherein the resource assignment includes resources for a Physical Uplink Shared Channel (PUSCH), and wherein the at least one processor is further configured to send the control information with data, if any, on the resources for the PUSCH.

39. A computer program product, comprising:
a non-transitory computer-readable medium comprising:
code for causing at least one computer to receive a resource assignment at a user equipment (UE) potentially causing excessive emissions out of band due to transmission of control information, the resource assignment being selected to reduce the emissions out of band; and
code for causing at least one computer to send control information by the UE in accordance with the resource assignment;
wherein the resource assignment includes resources for sending data with semi-persistent scheduling (SPS); and
wherein the non-transitory computer-readable medium further includes code for causing the at least one computer to send the control information on the assigned resources for SPS instead of on resources available for sending the control information.

40. The computer program product of claim 39, wherein the UE potentially causes excessive emissions out of band when sending only control information on a Physical Uplink Control Channel (PUCCH) near an edge of system bandwidth, wherein the resource assignment includes resources for a Physical Uplink Shared Channel (PUSCH), and wherein the non-transitory computer-readable medium further includes code for causing the at least one computer to send the control information with data, if any, on the resources for the PUSCH.

* * * * *